Nov. 21, 1944. F. A. LINDGREN Re. 22,563
KERF-CUTTING MACHINE
Original Filed Aug. 26, 1940 5 Sheets-Sheet 1
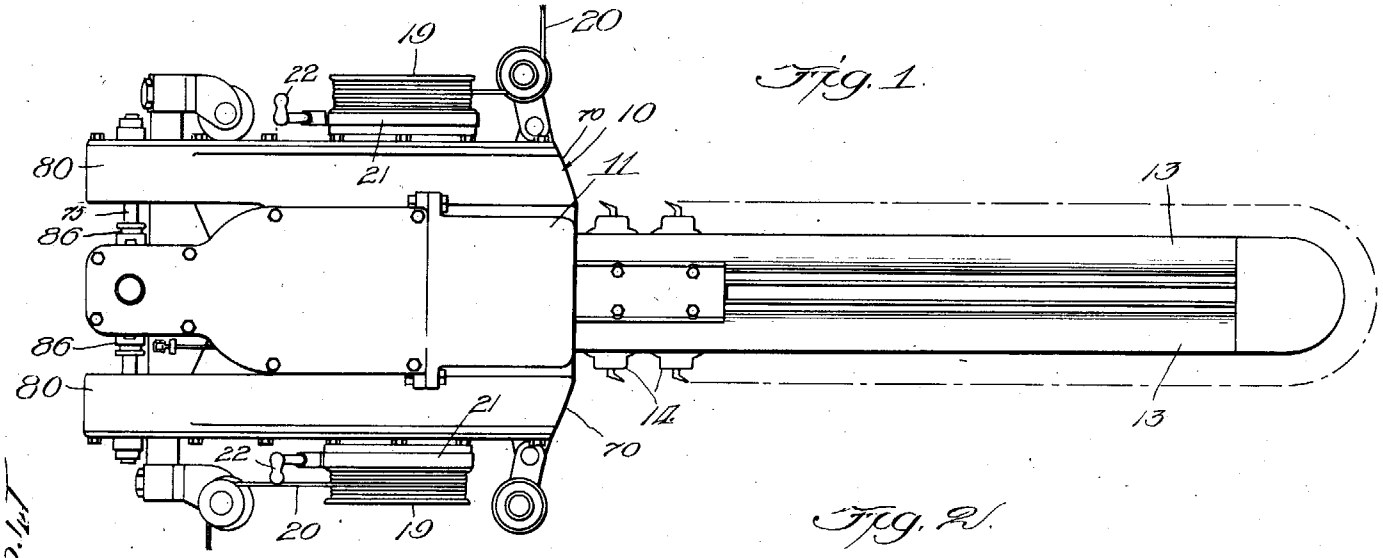
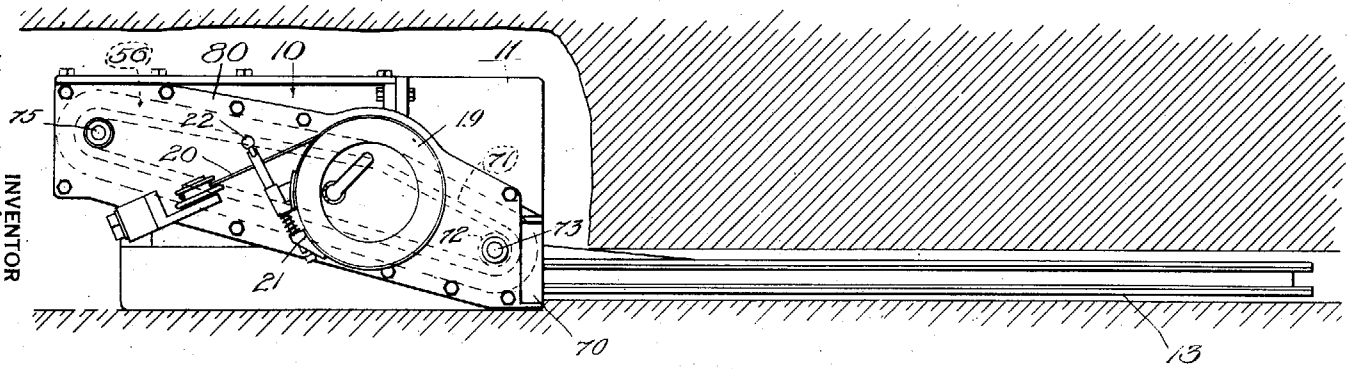
INVENTOR
Frank A. Lindgren
BY
Clarence F. Poole
ATTORNEY Nov. 21, 1944. F. A. LINDGREN Re. 22,563
KERF-CUTTING MACHINE
Original Filed Aug. 26, 1940 5 Sheets-Sheet 2
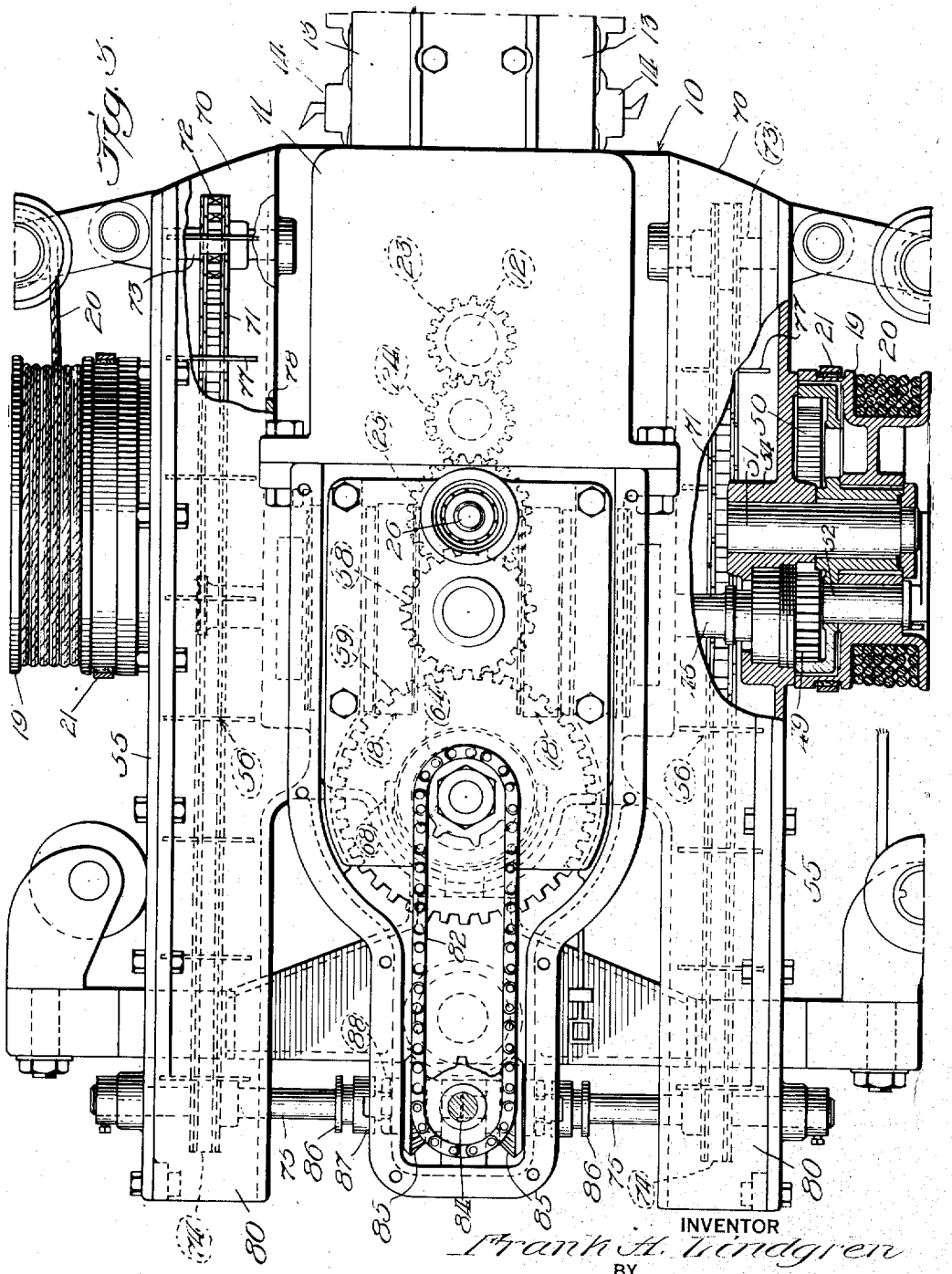
INVENTOR
Frank A. Lindgren
BY
Clarence A. Poole
ATTORNEY Nov. 21, 1944. F. A. LINDGREN Re. 22,563

KERF-CUTTING MACHINE

Original Filed Aug. 26, 1940 5 Sheets-Sheet 3

INVENTOR,
Frank A. Lindgren
BY Clarence F. Poole
ATTORNEY

Nov. 21, 1944. F. A. LINDGREN Re. 22,563

KERF-CUTTING MACHINE

Original Filed Aug. 26, 1940 5 Sheets-Sheet 4

INVENTOR
Frank A. Lindgren
BY Clarence F. Pole
ATTORNEY

Nov. 21, 1944. F. A. LINDGREN Re. 22,563

KERF-CUTTING MACHINE

Original Filed Aug. 26, 1940 5 Sheets-Sheet 5

INVENTOR
Frank A. Lindgren
BY
Clarence A. Poole
ATTORNEY

Reissued Nov. 21, 1944 Re. 22,563

UNITED STATES PATENT OFFICE 22,563

KERF-CUTTING MACHINE

Frank A. Lindgren, La Grange, Ill., assignor to Goodman Manufacturing Company, Chicago, Ill., a corporation of Illinois Original No. 2,298,392, dated October 13, 1942, Serial No. 354,180, August 26, 1940. Application for reissue September 18, 1944, Serial No. 554,634

12 Claims. (Cl. 262—30)

This invention relates to improvements in kerf-cutting machines of the continuous cutter type adapted to cut a kerf in a coal face while slidably moved along the mine bottom by flexible draft devices.

The principal objects of the invention are to provide a new and improved mining machine of a low compact construction having a novel and simplified form of cuttings collecting and conveying means, for collecting the cuttings brought rearwardly from the kerf by the cutter chain and elevating them for discharge into a conveyer or other receptacle.

A further object of my invention is to provide a compact and simplified form of drive gearing for the feed drums and cutter chain drive sprocket, together with a novel form of drive connection to the slack conveyers so that each will be driven in the proper direction during either direction of cutting.

Other objects of my invention will appear from time to time as the description proceeds and with reference to the accompanying drawings wherein:

Figure 1 is a top plan view of a mining machine constructed in accordance with my invention;

Figure 2 is a view in side elevation of the machine shown in Figure 1, showing the cutter bar in a coal seam;

Figure 3 is an enlarged fragmentary plan view of the machine shown in Figure 1, with one of the gear covers removed and with certain parts broken away and certain other parts shown in horizontal section in order to more clearly illustrate certain details of the invention;

Figure 8:
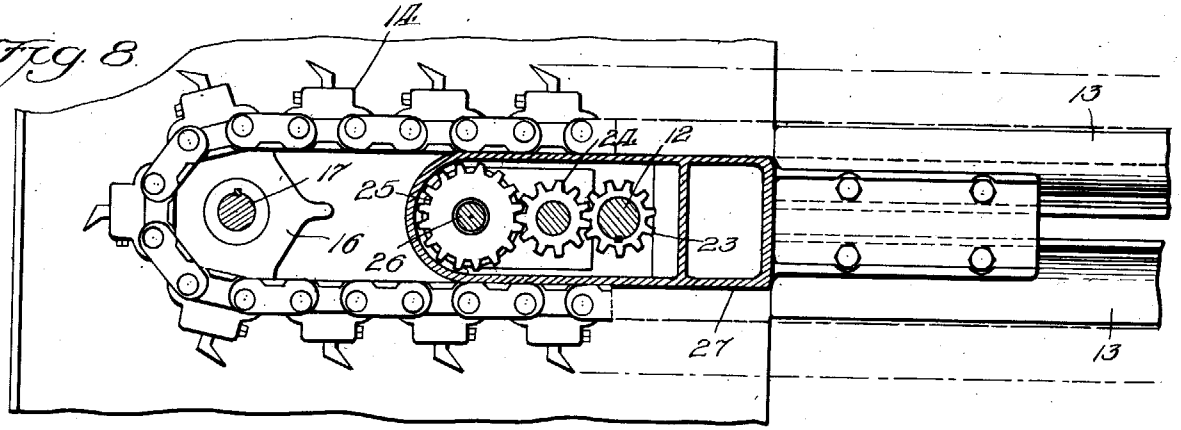
Figure 7:
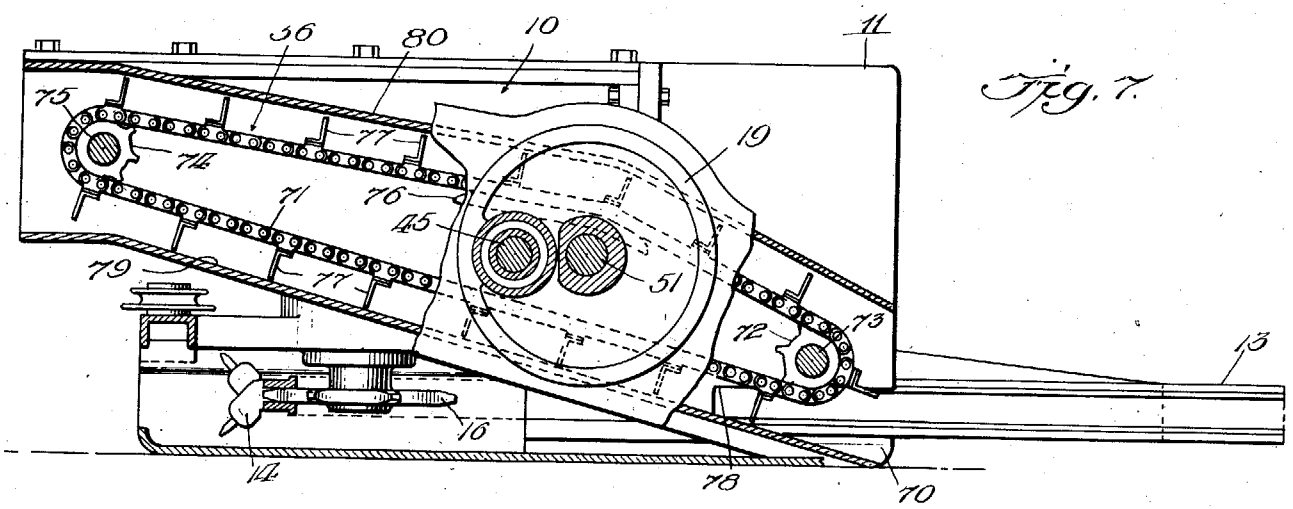

Figure 7 is a view in side elevation of the machine shown in Figure 1, with certain parts broken away in order to show certain details of the slack conveyer; and Figure 8 is an enlarged fragmentary plan view of the forward part of the machine, with certain parts removed and broken away and certain other parts shown in section, in order to illustrate certain details in the arrangement of the drive connection to the operative parts of the machine from the lower end of the motor shaft.

Referring now in particular to the drawings, the embodiment of my invention illustrated therein includes generally a main frame 10 having a motor 11 mounted at the forward end thereof. Said motor is provided with a motor shaft 12 arranged for rotation about a vertical axis, and a cutter bar 13 mounted on said frame in planes beneath said motor, projects forwardly therefrom. Said cutter bar has a cutter chain 14 guided for movement thereabout, which is driven from a sprocket 16 on the lower end of a vertical shaft 17, disposed adjacent the rear end of the machine.

The machine is moved about the mine on its bottom and is sumped into and moved across the coal face by means of a plurality of winding drums 19, 19 having flexible cables 20, 20 wound thereon and adapted to be extended therefrom and attached to fixed abutments remote from the machine. Each of said winding drums is adapted to be independently driven from the motor 11 at either a high or low frictionally controlled speed through a separate planetary 18. A brake band 21 controlled by a hand crank 22, in the usual manner, is provided for each of said winding drums to retard the rotation of the respective drum when disconnected from the motor 11, so said drum may serve as a tail rope drum for the machine.

Figure 5:
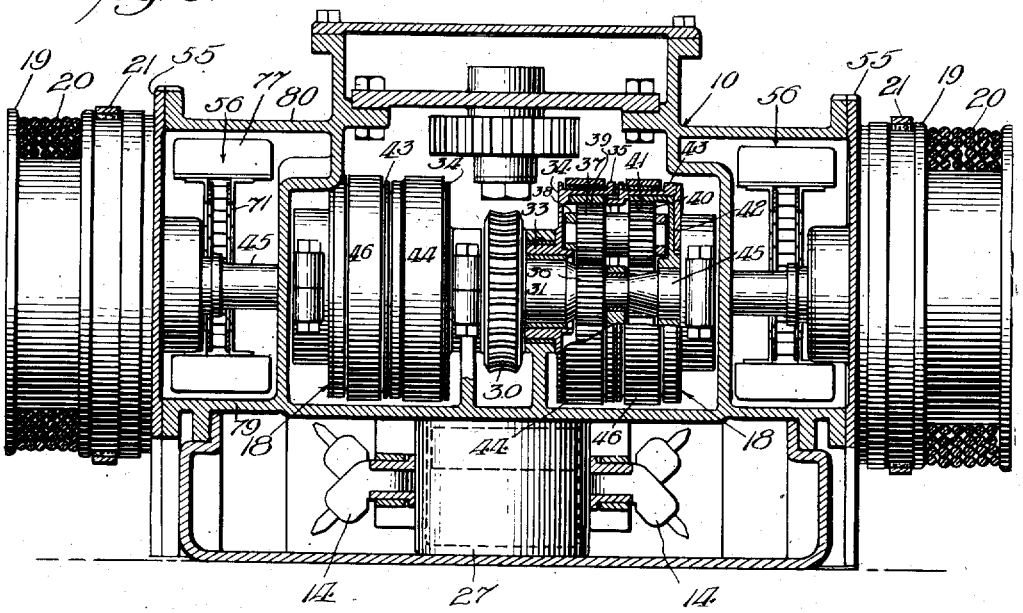
Figure 5 is a sectional view taken substantially along line 5—5 of Figure 4.
Figure 6:
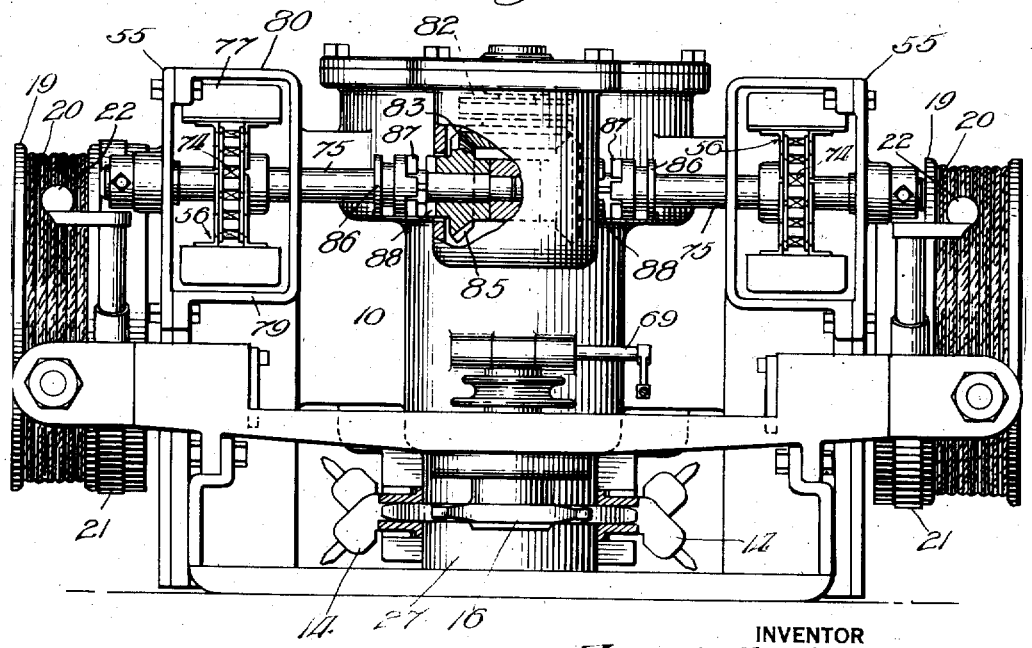
Figure 6 is a rear end view of the machine, with certain parts shown in section.

Referring now in particular to the novel and compact form of drive connection to the cutter chain drive sprocket 16, and to the winding drums 19, 19, an armature pinion 23 is mounted on the lower end of the motor shaft 12, within the inner lateral boundaries of the cutter chain 14. Said armature pinion meshes with an idler gear 24 which meshes with and drives a spur gear 25 on the lower end of a vertical shaft 26. Said idler gear and spur gear are likewise disposed within the inner lateral boundaries of the cutter chain, and are recessed beneath the top of said chain and are housed in a frame portion 27 of the main frame 10, the outer lateral sides of which form a bearing member along which the cutter chain 14 rides. This arrangement enables the compactness of the machine to be maintained, reducing the overall height and width thereof, and permits said gears disposed within the inner lateral boundaries of the path of travel of the cutter chain to be completely housed and free from dirt. A worm 29, mounted on the vertical shaft 26 intermediate the ends thereof, meshes with and drives a worm gear 30 on a transversely extending shaft 31. Said shaft is journaled within the hubs 33, 33 of casings 34, 34 of the planetary geared reduction devices 18, 18 and has spur pinions 36, 36 mounted on opposite ends thereof, which serve as sun gears for driving said planetaries (see Figure 5).

The planetaries 18, 18, as herein shown, are each of a similar construction which is well known to those skilled in the art, so will only be shown and described insofar as is necessary to make my present invention readily understandable. The sun gear 36 of each planetary meshes with planetary pinions 37, 37 mounted in a cage 38. Said planetary pinions mesh with an internal gear 39 secured to the inner periphery of a flanged portion 35 of the casing 34. Planetary pinions 40, 40 are mounted coaxially with the planetary pinions 37, 37 and rotate therewith and mesh with an internal gear 41 on a spider 42 keyed on a transverse shaft 45, for driving said shaft. A casing 43 is disposed adjacent the casing 34, and with said casing encloses said spider and the planetary gearing. Said casing has the cage 38 secured thereto. A friction band 44 engages the flanged portion 35 of the casing 34 to hold it and the internal gear 39 from rotation. Another friction band 46 engages the casing 43, to hold said casing and the cage 38 from rotation.

When the casing 34 and internal gear 39 are held from rotation by the friction band 44, the shaft 45 will be driven through the sun gear 36, planetary pinions 37, 37 orbitally moving about said internal gear, and planetary pinions 40, 40 meshing with and driving the internal gear 41 at a relatively slow speed.

When the friction band 46 engages the outer periphery of the casing 43, the cage 38 will be held from rotation. The shaft 45 will thus be driven by the sun gear 36, meshing with the planetary pinions 37, 37 and driving said pinions and the coaxial planetary pinions 40, 40, which last mentioned planetary pinions mesh with and drive the internal gear 41 at a relatively high rate of speed.

A pinion 49 on the outer end of each transverse shaft 45 meshes with an internal gear 50, freely mounted on a stub shaft 51 (see Figure 3). Each feed drum 19 is freely mounted on a hub of one of said internal gears and, as herein shown, is operatively connected with said internal gear by means of a pin 52 registering for engagement with suitable apertures formed in said feed drum and internal gear, respectively. Said pin and apertures thus form a means to disconnect said feed drum from its internal gear to permit free paying off of its associated feeding member, when desired. Each stub shaft 51 is mounted in a bearing boss 54, herein shown as being formed integrally with an outer cover 55 for a slack conveyer 56, one of which slack conveyers extends along each side of said cutter bar and is mounted within the lateral boundaries of the frame for the mining machine. Said slack conveyer will be more fully described as this specification proceeds. The shafts 45, 45 extend between the upper and lower runs of the slack conveyers, and said bearing bosses extend within the boundaries of said slack conveyers, in order to permit the width and height of the machine to be reduced.

Figure 4:
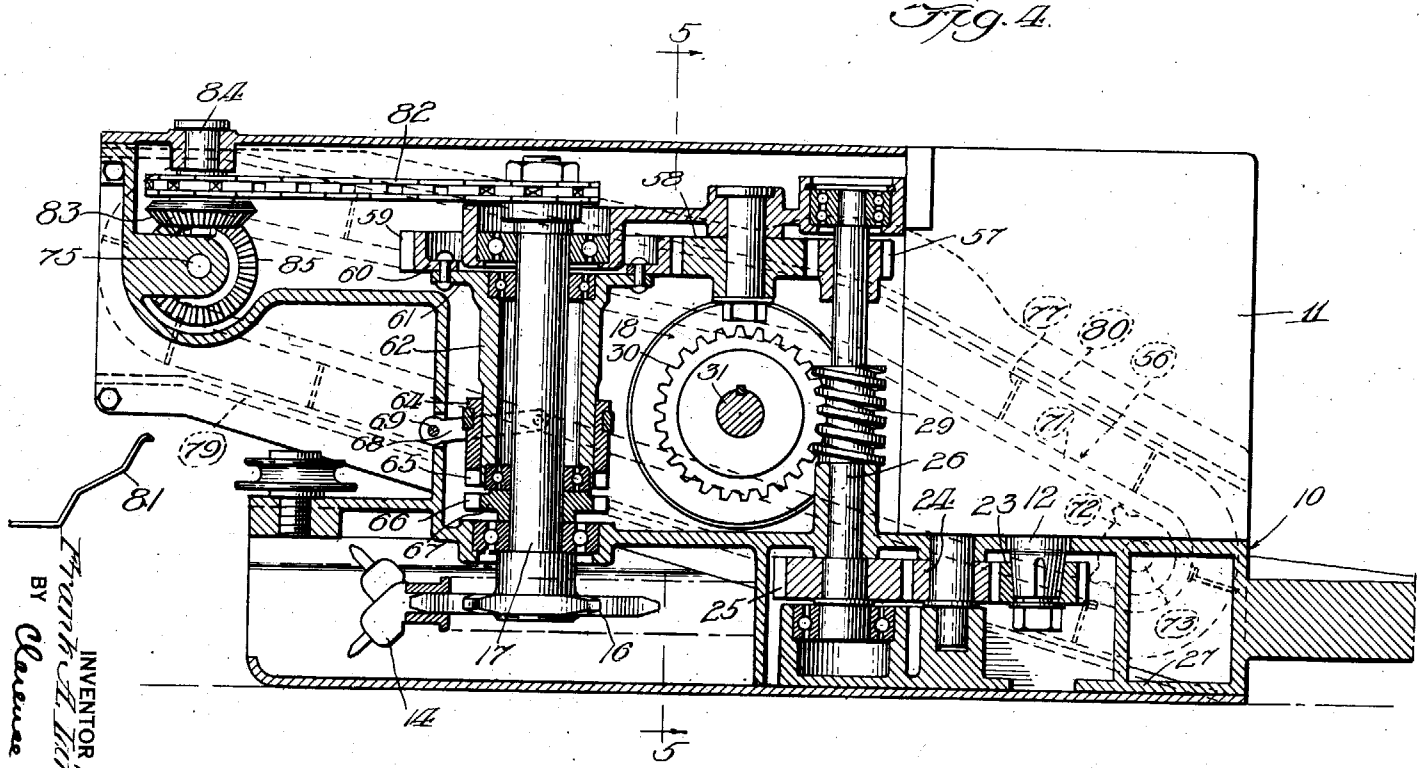
Figure 4 is a fragmentary longitudinal sectional view of the machine, drawn to substantially the same scale as Figure 3.

The drive to the cutter chain drive sprocket 16 includes a spur pinion 57, mounted on the upper end of the vertical shaft 26 and meshing with an idler gear 58 (see Figures 3 and 4). Said idler gear meshes with and drives a spur ring gear 59, provided with a lower flanged portion 60 which is secured to an upper flange 61 of a driving sleeve 62. Said driving sleeve is journaled on the vertical shaft 17, for free rotation with respect thereto, and has a clutch member 64, with depending jaws 65, slidably mounted thereon. Said jaws are adapted to be engaged with jaws 66 of a clutch member 67, secured to the vertical shaft 17, for driving said shaft. A suitable clutch yoke 68, mounted on a rock shaft 69, is provided for shifting said clutch member, to selectively connect said cutter chain sprocket with said ring gear. The system of levers for shifting said clutch member is not herein shown or described in detail since it is no part of my present invention and is well known to those skilled in the art.

Referring now to the novel form and arrangement of the cuttings collecting conveyers 56, 56, said conveyers are recessed within the sides of the machine frame and extend along opposite sides of the machine in parallel relation with respect to the cutter bar 13 just outside of the path of the bits of the cutter chain 14. Each of said slack conveyers is provided with a receiving end 70 open to the front of the machine and disposed adjacent the coal face when the cutter bar is fully sumped in the coal and is cutting across the coal face, and opening towards the coal face, to collect the slack withdrawn from the coal face by the cutter chain 14. One of said slack conveyers is adapted to be utilized when the machine is cutting in one direction and the other of said slack conveyers is adapted to be utilized when the machine is cutting in an opposite direction, and each of said slack conveyers is of a similar construction so the construction of one only will herein be described in detail.

As herein shown, the slack conveyer 56 includes an endless chain 71 having spaced apart flights 77, 77 projecting outwardly therefrom. Said chain is trained about an idler sprocket 72 mounted on a transverse shaft 73, disposed adjacent the entering end 70 of the conveyer. From said idler sprocket said chain extends in an upwardly inclined direction to a drive sprocket 74 on a transverse shaft 75. From thence said chain extends in a forwardly direction over a bearing shoe 76, to and around the idler sprocket 72. The flights 77 are adapted to move material along a bottom 79 of a casing 80 for the conveyer (see Figure 7). Said casing is herein shown as being formed integral with the main frame 10 and is provided with a discharge end disposed above the ground and adjacent the rear of the machine, to discharge cuttings into a conveyer 81 which may extend along the coal face in parallel relation with respect thereto (see Figure 4). An opening 78 extending along the cutter bar, above the bottom plate 79, is provided on the inner side of said casing to permit the collection of the cuttings thrown laterally by the cutter chain as it passes by said opening (see Figures 3 and 7).

The drive to the conveyers 56, 56 is arranged to selectively drive said conveyers at a greater speed than the speed of the cutter chain and includes a chain and sprocket drive 82 which drives a bevel gear 83 on a vertical stub shaft 84 from the upper end of the vertical shaft 17. Said bevel gear and stub shaft are disposed adjacent the rear upper portion of the main frame 10 and said bevel gear meshes with a pair of facing bevel gears 85, 85. Each of said facing bevel gears is freely mounted on an adjacent end of the transverse shaft 75. A clutch member 86 is herein shown as being feathered on each transverse shaft 75. Each of said clutch members is provided with jaws 87, 87 adapted to engage jaws 88, 88 formed on the hub of the bevel gear 85, to form a selective driving connection for each shaft 75 from its respective bevel gear.

The drive arrangement to the shafts 75, 75 is thus such that each of said shafts and the conveyers 56, 56 driven thereby, will be driven in opposite directions while the motor 11 is rotating in one direction. The reason for so arranging this drive connection is to insure that each conveyer will be driven in the proper direction when cutting either from right to left or from left to right. When cutting from right to left, the slack conveyer on the left-hand side of the machine will be in operation to collect the cuttings and will be connected to the motor 11, to be driven in a direction to move material upwardly along the bottom 79 of the casing 80. When cutting from left to right, the direction of rotation of the motor 11 must be reversed in order to drive the cutter chain 14 in the proper cutting direction. Upon reversal of said motor, the slack conveyer on the right-hand side of the machine will be driven in a direction to move material upwardly along the bottom 79 of the casing 80, so said slack conveyer will collect and discharge the cuttings during this direction of cutting.

It may be seen from the foregoing that a new and improved form of mining machine has been provided which is of a low, compact form and which has slack conveyers incorporated therein as a part of the machine, so arranged that the receiving ends of said conveyers are closely adjacent the coal face and in the path of the cuttings out and discharged by the cutter chain so said conveyers will collect these cuttings and convey them away from the machine in either direction of cutting. It may further be seen that the machine is efficiently constructed for cutting in reverse directions with the conveyer recessed within and a part of the machine frame proper, enabling the low overall height, width and length of the machine necessary for ready maneuverability and operation in confined spaces, to be attained.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a mining machine of the type slidable along the mine bottom on its bottom during cutting, a main frame, a cutter bar projecting forwardly from said main frame and having a cutter chain movable thereabout in an orbital path, and cuttings collecting means extending along the advance side of said machine from the lower forward end thereof including a conveyer extending along and recessed within the advance side of said machine and having a re-receiving end disposed adjacent said cutter chain and opening to the forward end of said machine and having a discharge end adjacent the upper rear end of said machine.

2. In a mining machine, a main frame, a motor, a cutter bar projecting from said frame and having a cutter chain movable thereabout in planes disposed beneath said motor, and a cuttings collecting conveyer extending along the advance side of said main frame to one side of said cutter bar and having a receiving end opening to the forward end of said machine and alongside of said cutter chain, for collecting the cuttings cut by said cutter chain, and having a discharge end at the upper rear end of said main frame for discharging the cuttings to the rear of said main frame.

3. In a mining machine, a main frame, a motor, a cutter bar projecting from said frame and having a cutter chain movable thereabout in a path extending beneath said motor, and an upwardly inclined cuttings collecting conveyer extending along the advance side of said main frame from the lower forward end thereof and opening to the forward end thereof adjacent said cutter chain, for collecting the cuttings discharged by said cutter chain and discharging them to the rear of said main frame.

4. In a mining machine of the type slidable along the mine bottom on its bottom during cutting, a main frame, a cutter bar projecting forwardly from said main frame and having a cutter chain movable thereabout in an orbital path, feed mechanism for said machine including a feed drum disposed at one side of the machine and a flexible draft device adapted to be wound thereon, and a cuttings collecting means extending along the advance side of the machine and disposed within the lateral boundaries of said feed drum, said cuttings collecting means including a conveyer disposed adjacent said cutter chain and opening alongside of said cutter chain and to the forward end of the machine.

5. In a mining machine of the type slidable along a mine bottom on its bottom during cutting, a main frame, a cutter bar projecting forwardly from said main frame and having a cutter chain movable thereabout in an orbital path, feed mechanism for said machine including a feed drum disposed at one side of the machine and a flexible draft device adapted to be wound thereon, and a cuttings collecting means extending along the advance side of the machine and disposed within the lateral boundaries of said feed drum, said cuttings collecting means including an inclined bottom portion disposed within the lateral boundaries of said winding drum and extending in an upwardly inclined direction from the forward to the rear end of said main frame and conveying means for collecting and moving material discharged from said cutter chain upwardly along said inclined bottom.

6. In a mining machine of the type slidable along a mine bottom on its bottom during cutting, a main frame, a cutter bar projecting forwardly from said main frame and having a cutter chain movable thereabout in an orbital path, feed mechanism for said machine including a feed drum disposed at one side of the machine and a flexible draft device adapted to be wound thereon, and a cuttings collecting means extending along the advance side of the machine and disposed within the lateral boundaries of said feed drum, said cuttings collecting means including an inclined bottom portion disposed within the lateral boundaries of said winding drum and extending in an upwardly inclined direction from the forward end of said main frame, and a conveyer for moving material upwardly along said bottom including an endless chain, a drive sprocket therefor rotatable about a horizontal axis, and spaced apart flights projecting outwardly from said chain, said cuttings collecting means being open to the forward end of the machine and along said cutter chain.

7. In a reversible mining machine of the type slidable along a mine bottom on its bottom during cutting, a main frame, a motor, a cutter bar projecting forwardly of said main frame and motor and having a cutter chain movable thereabout in an orbital path, feed drums disposed at opposite sides of the machine and adapted to have flexible draft devices wound thereon, and cuttings collecting means extending along opposite sides of the machine and disposed within the lateral boundaries of said feed drums including conveyers extending along said cutter chain from the forward end of said main frame and opening along opposite sides of said cutter chain and to the forward end of the machine, for collecting the cuttings discharged by said cutter chain during opposite directions of cutting.

8. In a reversible mining machine of the type slidable along a mine bottom on its bottom during cutting, a main frame, a motor, a cutter bar projecting forwardly of said main frame and motor and having a cutter chain movable thereabout in an orbital path, feed drums disposed at opposite sides of the machine and adapted to have flexible draft devices wound thereon, and cuttings collecting means extending along opposite sides of the machine and disposed within the lateral boundaries of said feed drums including conveyers opening along opposite sides of said cutter chain and to the forward end of the machine, for collecting the cuttings discharged by said cutter chain during opposite directions of cutting, and drive connections from said motor for selectively driving either of said conveyers in directions so the conveyer on the advance side of the machine will always be driven in a conveying direction during cutting in one direction and the conveyer on the side of the machine which is the advance side in the opposite direction of cutting will be driven in a conveying direction upon reversal of said motor, for cutting in an opposite direction.

9. In a mining machine of the class described, a main frame, a motor disposed at the forward end of said main frame and having a vertical armature shaft, a cutter bar projecting forwardly from said main frame and motor and disposed in planes extending beneath said motor, a cutter chain drive sprocket disposed rearwardly of said motor, and drive connections from said motor to said cutter chain drive sprocket including an armature pinion and spur gear disposed within the orbit of said cutter chain and within the vertical limits of said cutter chain.

10. In a mining machine of the class described, a main frame, a motor disposed at the forward end of said main frame and having a vertical armature shaft, a cutter bar projecting forwardly from said main frame and motor and disposed in planes extending beneath said motor, a cutter chain drive sprocket disposed rearwardly of said motor, drive connections from said motor to said cutter chain drive sprocket including an armature pinion and spur gear disposed within the orbit of said cutter chain and within the vertical limits of said cutter chain, and means for enclosing said spur gear and pinion and serving as a guide means for the cutter chain.

11. In a mining machine of the class described, a main frame, a motor disposed at the forward end of said main frame and having a vertical armature shaft, a cutter bar projecting forwardly from said main frame and motor and disposed in planes extending beneath said motor, a cutter chain drive sprocket disposed rearwardly of said motor, a pair of feed drums disposed at opposite sides of said main frame and mounted for rotation about transverse axes, drive connections from said motor to said cutter chain drive sprocket and feed drums including an armature pinion and spur gear disposed within the orbit of said cutter chain and within the vertical limits of said cutter chain, and means for enclosing said spur gear and armature pinion and serving as a guide shoe for said cutter chain.

12. In a mining machine of the class described, a main frame, a motor disposed at the forward end of said main frame and having a vertical armature shaft, a cutter bar projecting forwardly from said main frame and motor and disposed in planes extending beneath said motor, a cutter chain drive sprocket disposed rearwardly of said motor, a pair of feed drums disposed at opposite sides of said main frame and mounted for rotation about transverse axes, and cuttings collecting means extending along opposite sides of the machine and disposed within the lateral boundaries of said feed drums and including conveyers opening along opposite sides of said cutter chain and to the forward end of the machine, for collecting the cuttings discharged by said cutter chain during opposite directions of cutting, drive connections from said motor to said cutter chain sprocket, feed drums and conveyers, for independently driving said cutter chain sprocket, feed drums and conveyers including an armature pinion and spur gear disposed within the path of said cutter chain.

FRANK A. LINDGREN.